US012213017B2

(12) United States Patent
Kang et al.

(10) Patent No.: US 12,213,017 B2
(45) Date of Patent: Jan. 28, 2025

(54) METHOD AND APPARATUS FOR DATA OFFLOADING FOR VEHICLE EDGE COMPUTING

(71) Applicant: Korea Advanced Institute of Science and Technology, Daejeon (KR)

(72) Inventors: Joonhyuk Kang, Daejeon (KR); Youngsu Jang, Yuseong-gu (KR)

(73) Assignee: KOREA ADVANCED INSTITUTE OF SCIENCE AND TECHNOLOGY, Daejeon (KR)

(*) Notice: Subject to any disclaimer, the term of this patent is extended or adjusted under 35 U.S.C. 154(b) by 431 days.

(21) Appl. No.: 17/671,057

(22) Filed: Feb. 14, 2022

(65) Prior Publication Data

US 2023/0180092 A1    Jun. 8, 2023

(30) Foreign Application Priority Data

Dec. 2, 2021    (KR) .................. 10-2021-0170738

(51) Int. Cl.
*H04W 36/32*    (2009.01)
*H04W 4/44*    (2018.01)
*H04W 72/0446*    (2023.01)

(52) U.S. Cl.
CPC ............. *H04W 36/32* (2013.01); *H04W 4/44* (2018.02); *H04W 72/0446* (2013.01)

(58) Field of Classification Search
CPC ............... H04W 36/32; H04W 36/087; H04W 72/0446; H04W 88/085; H04W 88/18; H04W 4/44; H04W 4/023
See application file for complete search history.

(56) References Cited

U.S. PATENT DOCUMENTS

| 2017/0330457 | A1* | 11/2017 | Bhalla ................... G08G 1/093 |
| 2018/0242190 | A1* | 8/2018 | Khoryaev ......... H04W 28/0284 |
| 2019/0149365 | A1* | 5/2019 | Chatterjee ........... H04L 25/0226 |
| | | | 370/329 |
| 2019/0166575 | A1* | 5/2019 | Van Phan ................ G01S 1/00 |

FOREIGN PATENT DOCUMENTS

| EP | 3349514 A1 * | 7/2018 | .............. H04W 4/02 |
| KR | 10-2018-0044992 A | 5/2018 | |

OTHER PUBLICATIONS

Jang, "Energy-Efficient Offloading Strategy in Vehicular Edge Computing System", Korea Advanced Institute of Science and Technology, 25 pages (2020).

* cited by examiner

*Primary Examiner* — Jae Y Lee
*Assistant Examiner* — Hector Reyes
(74) *Attorney, Agent, or Firm* — MARSHALL, GERSTEIN & BORUN LLP

(57) ABSTRACT

A data offloading method for vehicle edge computing is provided. The data offloading method may include transmitting input data to a road side unit (RSU) closest to a vehicle through an uplink, and receiving output data processed by the RSU closest to the vehicle through a downlink. The transmitting of the input data to the RSU closest to the vehicle through the uplink may include comparing a location of the vehicle with locations of candidate RSUs, and the transmitting of the input data to the RSU closest to the vehicle through the uplink and receiving of the output data processed by the RSU closest to the vehicle through the downlink may be performed in a state of occupying at least one time frame among time frames allocated for a communication between the vehicle and the candidate RSUs.

11 Claims, 3 Drawing Sheets

METHOD AND APPARATUS FOR DATA OFFLOADING FOR VEHICLE EDGE COMPUTING

CROSS-REFERENCE TO RELATED APPLICATION

This application claims the benefit of Korean Patent Application No. 10-2021-0170738 filed on Dec. 2, 2021, in the Korean Intellectual Property Office, the entire disclosure of which is incorporated herein by reference for all purposes.

BACKGROUND

1. Field of the Invention

One or more example embodiments relate to vehicle edge computing technology.

2. Description of the Related Art

With a continuous increase in the number of vehicles on roads and the development of internet of vehicles (IoV), a vehicle takes a significant part of a thing connected to the Internet. In IoV paradigm, a smart car may provide intelligent vehicle control, a traffic management and an interactive application through an equipped computing device, and communications technology. Such a service and an application program may need considerable computation resources and a limited time delay. However, computability of a general vehicle terminal is limited. An application using a number of computing resources raises a considerable problem to the vehicle terminal in which resources are limited.

To solve this problem, cloud computing that offloads the computing work of a vehicle by using a cloud server having superior computability has appeared, however, there is a problem that the efficiency of the offloading is significantly reduced since the cloud server is far away from a vehicle. Vehicle edge computing (VEC) supports computations for the vehicle at an edge node close to the vehicle, and thus, it is known that a more efficient support is possible than existing cloud computing.

SUMMARY

Example embodiments provide a data offloading method and apparatus that are capable of increasing the efficiency of offloading for vehicle edge computing.

The tasks to be solved by the present disclosure are not limited to the foregoing, and other tasks not mentioned herein will be clearly understood by those skilled in the art from the following description.

According to an aspect, there is provided a data offloading method for vehicle edge computing including transmitting input data to a road side unit (RSU) closest to a vehicle through an uplink, and receiving output data processed by the RSU closest to the vehicle through a downlink. The transmitting of the input data to the RSU closest to the vehicle through the uplink may include comparing a location of the vehicle with locations of candidate RSUs, and the transmitting of the input data to the RSU closest to the vehicle through the uplink and the receiving of the output data processed by the RSU closest to the vehicle through the downlink may be performed in a state of occupying at least one time frame among time frames allocated for a communication between the vehicle and the candidate RSUs.

In an example embodiment, the transmitting of the input data to the RSU closest to the vehicle through the uplink may be performed within one time frame, and the receiving of the output data processed by the RSU closest to the vehicle through the downlink may be performed within another time frame.

In an example embodiment, the comparing of the location of the vehicle with the locations of the candidate RSUs may include storing data on the locations of the candidate RSUs, calculated using the following equation:

$$p_m^r = (r_{RSU} + (m-1)d, 0), m=1, \ldots, M$$

where $r_{RSU}$ denotes a coverage radius of the RSU, m denotes an index indicating the number of the RSU, M denotes a total number of RSUs, d denotes a distance between the RSUs, and $p_m^r$ denotes a location of an $m^{th}$ RSU, calculating the location of the vehicle by using the following equation:

$$p_n^v = (n\Delta v_j, (j-1)d_{lane}), j=1, \ldots, J, n=1, \ldots, N$$

where n denotes an index indicating the number of a time frame, N denotes a total number of time frames, $\Delta$ denotes a length of the time frame, j denotes an index indicating the number of a lane, J denotes a total number of lanes, $v_j$ denotes a speed of the vehicle present in a $j^{th}$ lane, $d_{lane}$ denotes a width of the lane, $p_n^v$ and denotes a location of the vehicle present in the $j^{th}$ lane in an $n^{th}$ time frame, and comparing the location of the vehicle with the locations of the candidate RSUs to select a candidate RSU present at a location closest to the location of the vehicle among the candidate RSUs as the RSU closest to the vehicle.

In an example embodiment, the calculating of the location of the vehicle by using the equation may include identifying a lane to which the vehicle belongs.

In an example embodiment, the transmitting of the input data to the RSU closest to the vehicle through the uplink may include transmitting the input data to the RSU closest to the vehicle through the uplink by using a frequency division duplex (FDD) scheme.

In an example embodiment, the receiving of the output data processed by the RSU closest to the vehicle through the downlink may include receiving the output data processed by the RSU closest to the vehicle through the downlink by using an FDD scheme.

According to another aspect, there is provided a data offloading apparatus for vehicle edge computing including a controller and a communication unit implementing a wireless communication protocol. The controller may be configured to control, through the communication unit, input data to be transmitted to an RSU closest to a vehicle through an uplink, and to control, through the communication unit, output data processed by the RSU closest to the vehicle, to be received through a downlink, in a state of occupying at least one time frame among time frames allocated for a communication between the vehicle and candidate RSUs. The controller may be further configured to compare a location of the vehicle with locations of the candidate RSUs to identify the RSU closest to the vehicle.

In an example embodiment, the controller may be further configured to control, through the communication unit, the input data to be transmitted to the RSU closest to the vehicle through the uplink in a state of occupying any one time frame among the time frames allocated for the communication between the vehicle and the candidate RSUs, and to control, through the communication unit, the output data, processed by the RSU closest to the vehicle, to be received through the downlink in a state of occupying another time frame among the time frames allocated for the communication between the vehicle and the candidate RSUs.

In an example embodiment, the data offloading apparatus may further include a storage unit that stores data on the locations of the RSUs, calculated using the following equation:

$$p_m^r = (r_{RSU} + (m-1)d, 0), m = 1, \ldots, M$$

where $r_{RSU}$ denotes a coverage radius of the RSU, m denotes an index indicating the number of the RSU, M denotes a total number of RSUs, d denotes a distance between the RSUs, and $p_m^r$ denotes a location of an $m^{th}$ RSU, and the controller may be further configured to calculate the location of the vehicle by using the following equation:

$$p_n^v = (n\Delta v_j, (j-1)d_{lane}), j = 1, \ldots, J, n = 1, \ldots, N$$

where n denotes an index indicating the number of a time frame, N denotes a total number of time frames, Δ denotes a length of the time frame, j denotes an index indicating the number of a lane, J denotes a total number of lanes, $v_j$ denotes a speed of the vehicle present in a $j^{th}$ lane, $d_{lane}$ denotes a width of the lane, and $p_n^v$ denotes a location of the vehicle present in the $j^{th}$ lane in an $n^{th}$ time frame, and to compare the location of the vehicle with the locations of the candidate RSUs to select a candidate RSU present at a location closest to the location of the vehicle among the candidate RSUs as the RSU closest to the vehicle.

In an example embodiment, the controller may be further configured to identify a lane to which the vehicle belongs.

In an example embodiment, the controller may be further configured to control the input data to be transmitted to the RSU closest to the vehicle through the uplink by using an FDD scheme.

In an example embodiment, the controller may be further configured to control the output data, processed by the RSU closest to the vehicle, to be received through the downlink by using an FDD scheme.

Additional aspects of example embodiments will be set forth in part in the description which follows and, in part, will be apparent from the description, or may be learned by practice of the disclosure.

According to example embodiments, there is a technical effect of increasing an efficiency of data offloading for vehicle edge computing.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
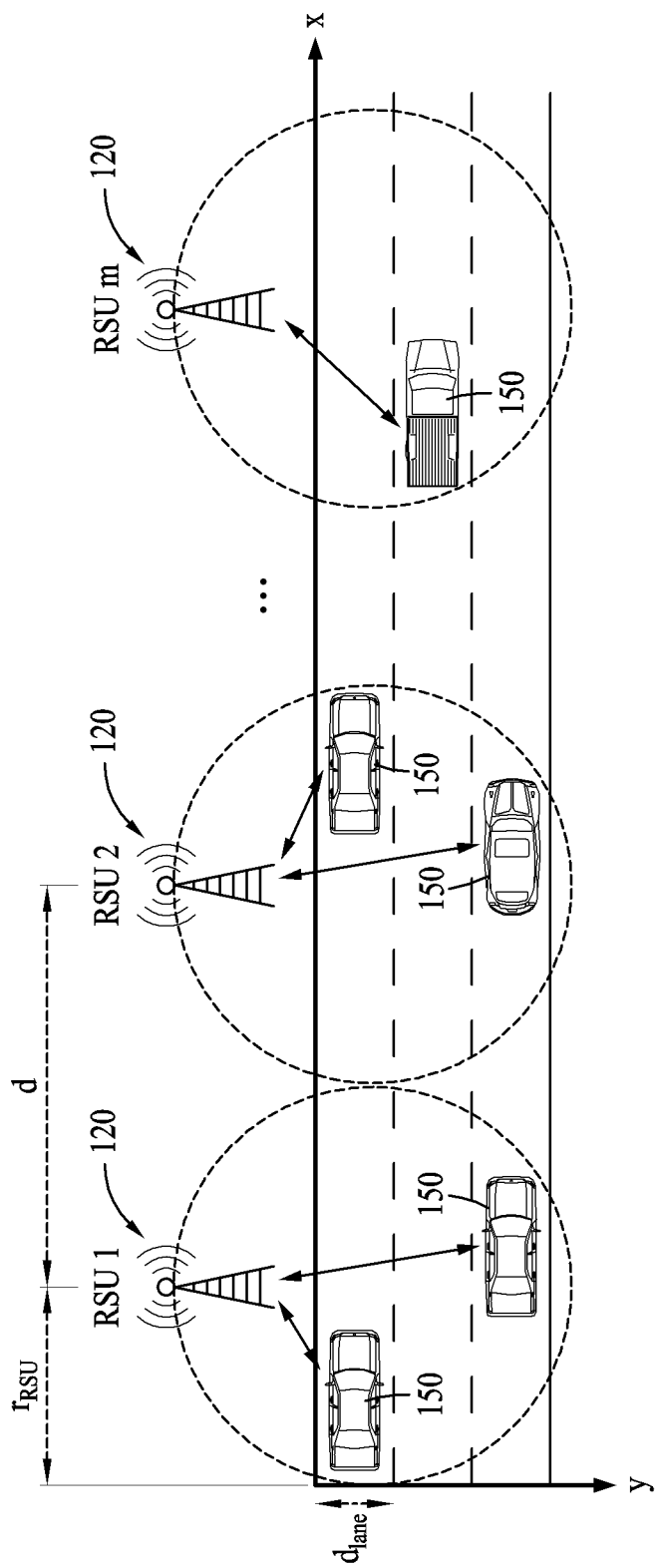
FIG. 1 illustrates an environment of a vehicle edge computing system in which vehicles on a road offload a task to a road side unit (RSU) located nearby according to an example embodiment.

The following structural or functional descriptions of example embodiments are merely intended for the purpose of describing the example embodiments and the example embodiments may be implemented in various forms. The example embodiments are not meant to be limited, but it is intended that various modifications, equivalents, and alternatives are also covered within the scope of the claims.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure.

It will be understood that when a component is referred to as being "connected to" another component, the component can be directly connected or coupled to the other component or intervening components may be present.

As used herein, the singular forms "a", "an", and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof.

Unless otherwise defined, all terms used herein including technical or scientific terms have the same meanings as those generally understood consistent with and after an understanding of the present disclosure. Terms, such as those defined in commonly used dictionaries, should be construed to have meanings matching with contextual meanings in the relevant art and the present disclosure, and are not to be construed as an ideal or excessively formal meaning unless otherwise defined herein.

Hereinafter, example embodiments will be described in detail with reference to the accompanying drawings. When describing the example embodiments with reference to the accompanying drawings, like reference numerals refer to like components and a repeated description related thereto will be omitted.

FIG. 1 illustrates an environment of a vehicle edge computing system in which vehicles on a road offload a task to a road side unit (RSU) located nearby according to an example embodiment.

In an environment of a vehicle edge computing system according to the present disclosure, it is assumed that K vehicles 150 may travel along a one-way road with J lanes. According to an example embodiment of FIG. 1, five vehicles 150 may travel along three lanes. In addition, in the environment of a vehicle edge computing system according to the present disclosure, it is assumed that m RSUs (RSU 1, RSU 2, . . . , RSU m), for example, RSUs 120, may be disposed along the one-way road with J lanes. The RSUs 120 may be server grade units that implement a function of vehicle edge computing. Here, it is assumed that a distance between the RSUs 120 may be d, a coverage radius of each of the RSUs 120 may be $r_{RSU}$, and a width of the lane may be $d_{lane}$. Under the above assumption, a location of an $m^{th}$ RSU may be represented by Equation 1 below.

$$p_m^r = (r_{RSU} + (m-1)d, 0), m = 1, \ldots, M \quad \text{[Equation 1]}$$

In Equation 1, $r_{RSU}$ denotes a coverage radius of the RSU 120, m denotes an index indicating the number of RSUs 120, M denotes a total number of RSUs 120, d denotes a distance between the RSUs 120, and $p_m^r$ denotes a location of the $m^{th}$ RSU 120.

In the environment of a vehicle edge computing system according to the present disclosure, it is assumed that K vehicles 150 may depart from a start time point at different times $t_k \in \{t_1, \ldots, t_K\}$, the vehicles 150 present in the same lane may move at the same speed, and a speed of the vehicles in each of the lanes may be $v_j \in \{v_1, \ldots, v_J\}$.

Figure 2:
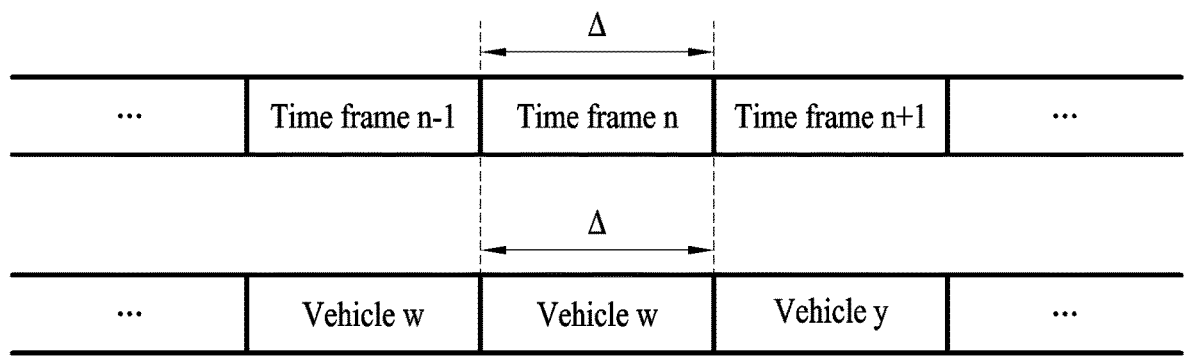
FIG. 2 illustrates a one-to-one connection scheme between a vehicle and an RSU used in a vehicle edge computing system according to an example embodiment.

According to the present disclosure, as illustrated in FIG. 2, at least one time frame may be allocated to a vehicle 150 to offload a task among time frames allocated for a communication between the vehicle 150 and the RSUs 120, and the vehicle 150 may offload the task to a selected RSU 120 during the at least one time frame. If a predetermined time T is divided into equal N time frames, a length of each of the time frames may be $\Delta=T/N$. According to the present disclosure, one vehicle 150 may perform a one-to-one connection with the selected RSU 120 during at least a time of $\Delta$. According to the present disclosure, a scheme of the above connection may be referred to as a "one-to-one connection scheme". In an environment of a vehicle edge computing system according to the present disclosure, it is assumed that a location of the vehicle 150 may not change during each of the time frames due to a length ($\Delta$) of the time frame being sufficiently short. Under the above assumption, the location of the vehicle 150 present in a $j^{th}$ lane in an $n^{th}$ time frame may be represented by Equation 2 below.

$$p_n^v = (n\Delta v_j, (j-1)d_{lane}), j=1, \ldots, J, n=1, \ldots, N \quad [\text{Equation 2}]$$

In Equation 2, n denotes an index indicating the number of the time frame, N denotes a total number of time frames, $\Delta$ denotes a length of the time frame, j denotes an index indicating the number of a lane, J denotes a total number of lanes, $v_j$ denotes a speed of the vehicle 150 present in a $j^{th}$ lane, $d_{lane}$ denotes a width of the lane, and $p_n^v$ denotes a location of the vehicle 150 present in the $j^{th}$ lane in an $n^{th}$ time frame.

Figure 3:
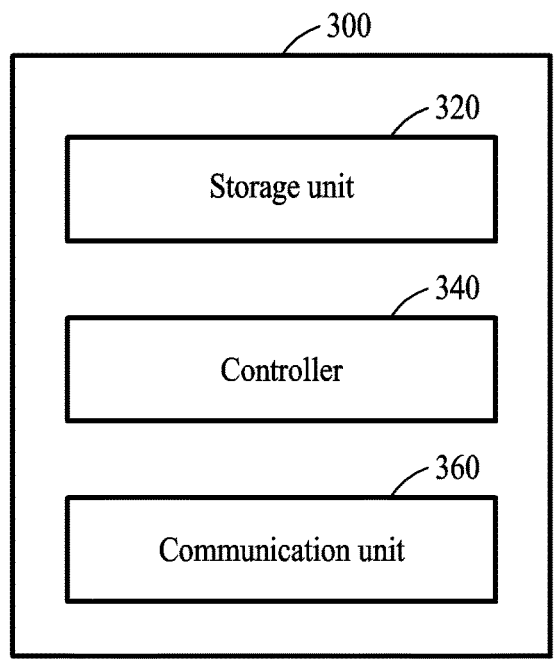
FIG. 3 is a block diagram illustrating a data offloading apparatus for vehicle edge computing equipped in a vehicle according to an example embodiment.

FIG. 3 is a block diagram illustrating a data offloading apparatus for vehicle edge computing equipped in a vehicle according to an example embodiment.

As illustrated in FIG. 3, a data offloading apparatus 300 may include a storage unit 320, a controller 340, and a communication unit 360. The storage unit 320 may store data on locations of RSUs 120, calculated using Equation 1 described above. The storage unit 320 may store a program and/or data for an operation of the controller 340, and store data that is input/output and the like. The storage unit 320 may include at least one type of storage mediums, for example, a flash type memory, a hard disk type memory, a multimedia card type memory, a card type memory (e.g., an SD or an XD memory, and the like), random access memory (RAM), static random access memory (SRAM), read-only memory (ROM), electrically erasable programmable read-only memory (EEPROM), programmable read-only memory (PROM), magnetic memory, a magnetic disk, and an optical disk. The communication unit 360 may implement radio access technologies (RATs) and communication protocols that are adopted in a 2G wireless communication network, such as a global system for mobile communication (GSM) network and a code division multiple access (CDMA) network, a wireless internet network, such as a Wi-Fi network, a portable internet network, such as a wireless broadband (WiBro) network and a worldwide interoperability for microwave access (WiMax) network, a wireless network that supports a packet transfer, a long-term evolution (LTE) (4G) network and/or a 5G network, and may include functions/characteristics of a communication unit of communication equipment used in the above wireless communication network, but a function of the communication unit 360 is not limited thereto. In this case, the RATs and the communication protocols may be embodied as appropriate hardware and/or firmware. The communication unit 360 may be designed to communicate with the RSUs 120 by using an FDD scheme in which different frequencies are used in an uplink communication from the vehicle 150 to the RSU 120 and a downlink communication from the RSU 120 to the vehicle 150.

The controller 340 may be configured to control, through the communication unit 360, input data to be transmitted to the RSU closest to the vehicle 150 through an uplink in a state of occupying at least one time frame among time frames allocated for a communication between the vehicle 150 and the RSUs 120, and to control, through the communication unit 360, output data, processed by the RSU closest to the vehicle 150, to be received through a downlink. The controller 340 may be further configured to compare a location of the vehicle 150 with locations of the RSUs 120 to identify the RSU 120 closest to the vehicle 150. In an example embodiment, the controller 340 may be further configured to control, through the communication unit 360, input data to be transmitted to the RSU closest to the vehicle 150 through an uplink in a state of occupying any one time frame among the time frames allocated for the communication between the vehicle 150 and the RSUs 120, and to control, through the communication unit 360, output data, processed by the RSU 120 closest to the vehicle 150, to be received through a downlink in a state of occupying another time frame among the time frames allocated for the communication between the vehicle 150 and the RSUs 120. The controller 340 may be further configured to identify a lane to which the vehicle 150 belongs, calculate the location of the vehicle 150 by using Equation 2 described above, and compare the location of the vehicle 150 with the locations of the RSUs 120, stored in the storage unit 320, to select the RSU 120 present at a location closest to the location of the vehicle 150 among the RSUs 120 as the RSU 120 closest to the vehicle 150.

Figure 4:
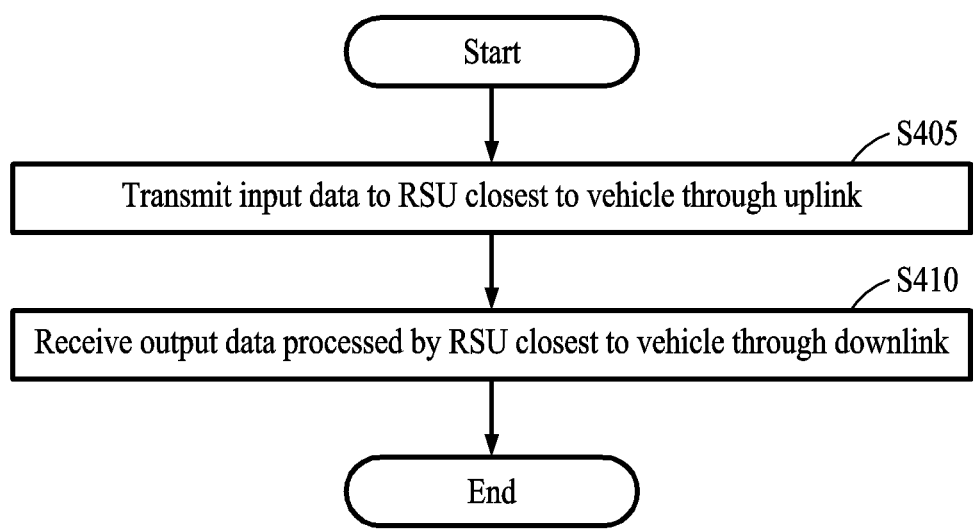
FIG. 4 is a flowchart illustrating a data offloading method for vehicle edge computing according to an example embodiment.

FIG. 4 is a flowchart illustrating a data offloading method for vehicle edge computing according to an example embodiment.

An example embodiment of the data offloading method may begin with operation S405 in which input data is transmitted to an RSU 120 closest to a vehicle 150 through an uplink. In operation S405, a location of the vehicle 150 may be compared with locations of RSUs 120. In an example embodiment, a lane to which the vehicle 150 belongs may be identified, the location of the vehicle 150 may be calculated using Equation 2 described above, and the location of the vehicle 150 may be compared with the locations of the RSUs 120, stored in a storage unit 320, such that the RSU 120 present at a location closest to the location of the vehicle 150 among the RSUs 120 may be selected as the RSU 120 closest to the vehicle 150. In operation S410, output data processed by the RSU 120 closest to the vehicle 150 may be received through a downlink. Operations S405 and S410 may be performed in a state of occupying at least one time frame among time frames allocated for a communication between the vehicle 150 and the RSUs 120. In an example embodiment, operation S405 may be performed within one time frame, and operation S410 may be performed within another time frame.

According to example embodiments described above, energy consumption of a vehicle may be significantly reduced, compared to a local implementation scheme in which all calculations are executed by the vehicle. According to example embodiments described above, a one-to-one connection scheme may be applied to a vehicle edge computing system, and as a result, the energy consumption of the vehicle may be reduced more than an existing orthogonal connection scheme. In addition, if the vehicle edge computing system according to example embodiments described above is used, the energy consumption of the vehicle may be minimized, and thus, a battery efficiency of the vehicle, in which energy is limited, such as an electric vehicle, may be increased.

The example embodiments described herein may be implemented using hardware components, software components, or a combination thereof. A processing device may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The method according to the above-described example embodiments may be recorded in non-transitory computer-readable media including program instructions to implement various operations which may be performed by a computer. The media may also include, alone or in combination with the program instructions, data files, data structures, and the like. The program instructions recorded on the media may be those specially designed and constructed for the purposes of the example embodiments, or they may be of the well-known kind and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), RAM, flash memory, and the like. The media may transfer media such as optical lines, metal lines, or waveguides including a carrier wave for transmitting a signal designating the program command and the data construction. Examples of program instructions include both machine code, such as code produced by a compiler, and files containing higher level code that may be executed by the computer using an interpreter.

The described hardware devices may be configured to act as one or more software modules in order to perform the operations of the above-described example embodiments, or vice versa.

While this disclosure includes example embodiments, it will be apparent to one of ordinary skill in the art that various changes in form and details may be made in these example embodiments without departing from the spirit and scope of the claims and their equivalents. The example embodiments described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A data offloading method for vehicle edge computing, the method comprising:

transmitting input data to a road side unit (RSU) closest to a vehicle through an uplink; and receiving output data processed by the RSU closest to the vehicle through a downlink, wherein the transmitting of the input data to the RSU closest to the vehicle through the uplink comprises:

comparing a location of the vehicle with locations of candidate RSUs by storing data on the locations of the candidate RSUs, calculated using a following equation:

$$p_m^r = (r_{RSU} + (m-1)d, 0), m=1, \ldots, M$$

where $r_{RSU}$ denotes a coverage radius of the RSU, m denotes an index indicating a number of RSUs, M denotes a total number of RSUs, d denotes a distance between the RSUs, and $p_m^r$ denotes a location of an $m^{th}$ RSU;

calculating the location of the vehicle by using a following equation:

$$p_n^v = (n\Delta v_j, (j-1)d_{lane}), j=1, \ldots, J, n=1, \ldots, N$$

where n denotes an index indicating the number of a time frame, N denotes a total number of time frames, $\Delta$ denotes a length of the time frame, j denotes an index indicating the number of a lane, J denotes a total number of lanes, $v_j$ denotes a speed of the vehicle present in a $j^{th}$ lane, $d_{lane}$ denotes a width of the lane, and $p_n^v$ denotes a location of the vehicle present in the $j^{th}$ lane in an $n^{th}$ time frame; and comparing the location of the vehicle with the locations of the candidate RSUs to select a candidate RSU, among the candidate RSUs, present at a location closest to the location of the vehicle as the RSU closest to the vehicle, wherein the transmitting of the input data to the RSU closest to the vehicle through the uplink and the receiving of the output data processed by the RSU closest to the vehicle through the downlink are performed in a state of occupying at least one time frame among time frames allocated for a communication between the vehicle and the candidate RSUs.

2. The method of claim 1, wherein the transmitting of the input data to the RSU closest to the vehicle through the uplink is performed within one time frame, and wherein the receiving of the output data processed by the RSU closest to the vehicle through the downlink is performed in another time frame.

3. The method of claim 1, wherein the calculating of the location of the vehicle by using the equation comprises identifying a lane to which the vehicle belongs.

4. The method of claim 1, wherein the transmitting of the input data to the RSU closest to the vehicle through the uplink comprises transmitting the input data to the RSU closest to the vehicle through the uplink by using a frequency division duplex (FDD) scheme.

5. The method of claim 1, wherein the receiving of the output data processed by the RSU closest to the vehicle through the downlink comprises receiving the output data processed by the RSU closest to the vehicle through the downlink by using a frequency division duplex (FDD) scheme.

6. A data offloading apparatus for vehicle edge computing, the apparatus comprising:
a controller;
a communication unit configured to implement a wireless communication protocol,
wherein the controller is configured to control, through the communication unit, input data to be transmitted to a road side unit (RSU) closest to a vehicle through an uplink, and to control, through the communication unit, output data, processed by the RSU closest to the vehicle, to be received through a downlink, in a state of occupying at least one time frame among time frames allocated for a communication between the vehicle and candidate RSUs,
wherein the controller is further configured to compare a location of the vehicle with locations of the candidate RSUs to identify the RSU closest to the vehicle; and
a storage unit configured to store data on the locations of the candidate RSUs, calculated using a following equation:

$$p_m^r = (r_{RSU} + (m-1)d, 0), m=1, \ldots, M$$

where $r_{RSU}$ denotes a coverage radius of the RSU, m denotes an index indicating a number of RSUs, M denotes a total number of RSUs, d denotes a distance between the RSUs, and $p_m^r$ denotes a location of an $m^{th}$ RSU; and
wherein the controller is further configured to:
calculate the location of the vehicle using a following equation:

$$p_n^v = (n\Delta v_j, (j-1)d_{lane}), j=1, \ldots, J, n=1, \ldots, N$$

where n denotes an index indicating the number of a time frame, N denotes a total number of time frames, $\Delta$ denotes a length of the time frame, j denotes an index indicating the number of a lane, J denotes a total number of lanes, $v_j$ denotes a speed of the vehicle present in a $j^{th}$ lane, $d_{lane}$ denotes a width of the lane, and $p_n^v$ denotes a location of the vehicle present in the $j^{th}$ lane in an $n^{th}$ time frame; and
compare the location of the vehicle with the locations of the candidate RSUs to select a candidate RSU, among the candidate RSUs, present at a location closest to the location of the vehicle as the RSU closest to the vehicle.

7. The apparatus of claim 6, wherein the controller is further configured to control, through the communication unit, the input data to be transmitted to the RSU closest to the vehicle through the uplink in the state of occupying the at least one time frame among the time frames allocated for the communication between the vehicle and the candidate RSUs, and to control, through the communication unit, the output data, processed by the RSU closest to the vehicle, to be received through the downlink in a state of occupying another time frame among the time frames allocated for the communication between the vehicle and the candidate RSUs.

8. The apparatus of claim 6, wherein the controller is further configured to identify a lane to which the vehicle belongs.

9. The apparatus of claim 6, wherein the controller is further configured to control the input data to be transmitted to the RSU closest to the vehicle through the uplink by using a frequency division duplex (FDD) scheme.

10. The apparatus of claim 9, wherein the controller is further configured to control the output data, processed by the RSU closest to the vehicle, to be received through the downlink by using the FDD scheme.

11. A non-transitory computer-readable storage medium storing instructions that, when executed by a processor, cause the processor to perform the method of claim 1.

* * * * *